July 7, 1925.

H. F. LICHTENBERG 1,544,663

LIQUID TESTING APPARATUS

Filed Feb. 11, 1924

INVENTOR
Harry F. Lichtenberg
by Popp & Powers
Attys.

July 7, 1925.  
H. F. LICHTENBERG  
LIQUID TESTING APPARATUS  
Filed Feb. 11, 1924

INVENTOR  
Harry F. Lichtenberg  
by Popp & Powers  
Attys.

July 7, 1925.

H. F. LICHTENBERG

LIQUID TESTING APPARATUS

Filed Feb. 11, 1924   3 Sheets-Sheet 3

1,544,663

INVENTOR
Harry F. Lichtenberg
by Poff & Pacaert
Attys.

Patented July 7, 1925.

1,544,663

UNITED STATES PATENT OFFICE.

HARRY F. LICHTENBERG, OF KENMORE, NEW YORK.

LIQUID-TESTING APPARATUS.

Application filed February 11, 1924. Serial No. 691,963.

*To all whom it may concern:*

Be it known that I, HARRY F. LICHTENBERG, a citizen of the United States, residing at Kenmore, in the county of Erie and State of New York, have invented new and useful Improvements in Liquid-Testing Apparatus, of which the following is a specification.

This invention relates to an apparatus for making chemical bacteriological tests and more particularly an apparatus of this character which is designed for testing the purity of milk in dairies.

It is the object of this invention to provide an apparatus of this character which can be compactly folded and conveniently carried about from one dairy or milk plant to another, which can be easily and readily unpacked and set up for use and which permits of conducting a large number of tests efficiently and conveniently so that this work is reduced to a minimum of cost and expenditure of time.

In the accompanying drawings.

Similar characters of reference refer to like parts in the several views.

In its general organization this apparatus comprises a water tank which when in use is adapted to contain a rack for supporting therein a plurality of test tubes containing samples of milk or other liquid which is to be tested, but when the apparatus is packed for transportation this water tank is adapted to hold the means for supporting the tubes during the testing operation, also the container for the supply of tubes, the container for the supply of corks, the means for supplying heat, and the various other accessories which are employed in connection with making tests such as pipettes and thermometers, this tank being adapted when in use to be supported upon a base or air chamber in which the air is heated for the purpose of maintaining a proper temperature of the water within the tank.

In the preferred construction the air chamber is made of rectangular form and provided with two longitudinal walls 10, 11 and two transverse walls 12 and 13 connecting the longitudinal walls, and in the upright position of the base it is open at the bottom and at the top. This base may be supported in any suitable manner, for instance by resting its lower edge on a table or other available support so as to close the same on the bottom. The walls of this base are preferably constructed of sheet metal such as copper so that the same is light, not liable to rust and capable of being readily cleaned. When this apparatus of which the base forms a part is to be transported, this base forms an enclosure for the remaining parts of the apparatus and its transportation is facilitated by providing one of the transverse walls, for instance, the wall 12 with a handle 14 of any suitable character for carrying the same.

Figure 3:
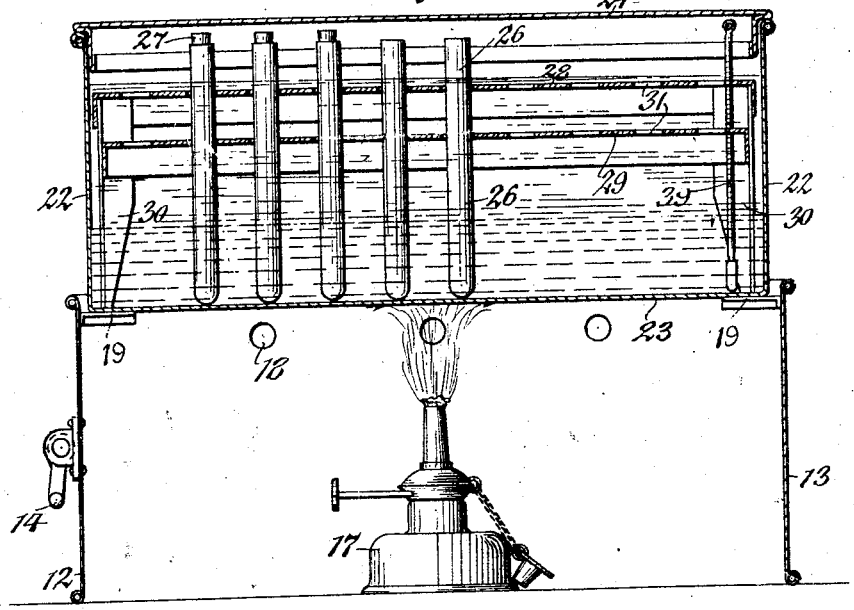
Figure 3 is a vertical longitudinal section of the apparatus showing the several parts in the position which they occupy while making a test of a plurality of cultures of milk or other liquid which is to be tested.
Figure 4:
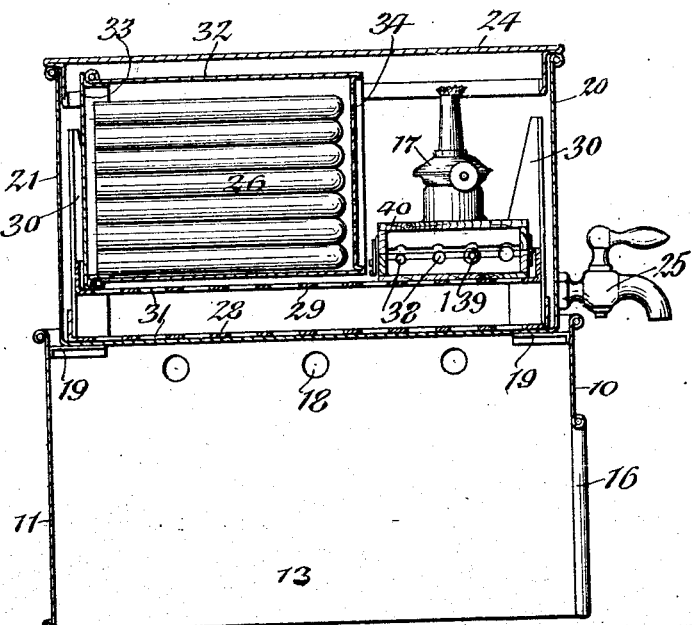
Figure 4 is a cross section taken on line 4—4, Figure 5 and showing some of the parts packed or nested preparatory to completely compacting the device ready for transportation.

In one of the walls of the base or chamber, for example, the wall 10, the same is provided with an inlet opening 16 through which air is admitted to the air chamber while the apparatus is in use, which opening also serves to admit a heating element into the air chamber for heating the air therein. This heating element may be of any suitable character, as for instance, an alcohol lamp 17 which may be moved into and out of the air chamber through the opening 16 thereof. Near its top the walls of the air chamber are provided with a plurality of air outlet openings 18 which permit the escape of heated air from the air chamber and supplement the air outlet spaces or passages which are present between the upper end of the air chamber and the means supported thereon for warming the test tubes. These test tube warming means are supported on the upper part or end of the air chamber by means of a plurality of upwardly facing shoulders or shelves 19 secured to the inner sides of the corners of the air chamber adjacent to the upper edge of the walls thereof, as shown in Figures 3 and 4.

The means for warming these test tubes comprise a water tank which is preferably constructed of suitable sheet metal such as copper which can be easily cleaned and comprises two longitudinal walls 20, 21, two transverse walls 22 connecting the longitudinal walls, a horizontal bottom 23 connecting the upright walls and a cover 24 removably engaging the upper edges of the tank walls so as to permit of opening and closing the latter. This water tank is of the same rectangular form as the base or air chamber but of somewhat smaller circumferential dimensions so that upon engaging the bottom of this tank with the shoulders 19 of the air chamber, an air passage will be formed between the space intervening between the side walls of the water tank and the walls of the air chamber.

By this means an air bath is provided around the bottom and side walls of the water tank for the purpose of heating the water which is placed in the latter for producing a water bath whereby the contents of the material in the test tubes is maintained at the desired temperature. This water is maintained at the proper height within the tank and when the same is no longer required, it is withdrawn therefrom through a drain cock or valve 25 arranged in one of the walls thereof near the bottom of the tank.

Figure 1:
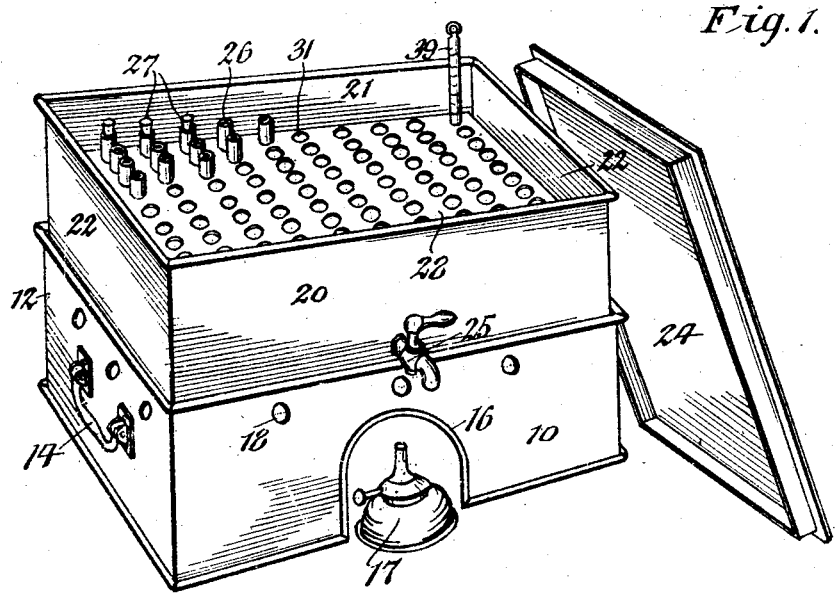
Figure 1 is a perspective view of this apparatus which has been unpacked and reassembled ready for use.
Figure 2:
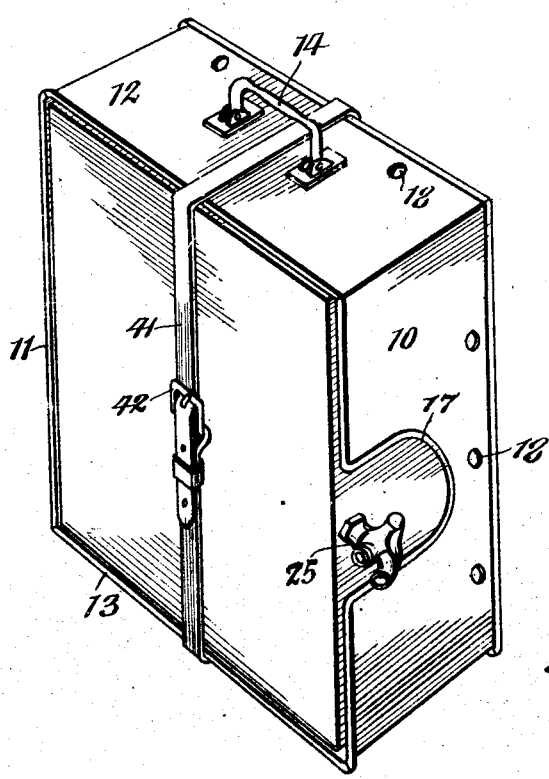
Figure 2 is a similar view showing the apparatus folded, packed or nested and the several parts fastened together ready for carriage or transportation from one place to another.

In the preferred construction the drain cock 25 is arranged on one of the longitudinal walls of the water tank in line with the inlet opening 16 of the wall 10 of the base or air chamber so that upon removing the tank from the top of the base, the latter may be slipped over the tank from the top of the same and thus permits of compactly folding or nesting these parts inasmuch as at this time the drain cock 25 will enter the inlet opening 16 of the base and thus avoid any interference between the parts while compacting them for storage or transporation, this relation of the parts being represented in Figure 2.

While warming a culture, the test tubes 26, usually of glass, containing the same are supported in an upright position within the water bath of the tank with the lower parts of these tubes submerged in the water bath and the lower ends thereof resting on the bottom of this tank, while the upper parts of these tubes are arranged within the tank above the water level and may have their mouths open ready to receive a charge of the liquid to be tested or the same may be covered by corks 27 after a sample of the liquid together with a testing solution has been placed therein.

These test tubes may be supported in this position by any suitable means, but preferably by means of a rack which is so constructed that the same may be employed in an upright position for supporting the test tubes in the proper position for making tests and also permit of reversing the rack within the water tank so as to provide a clear storage space in the upper part of the water tank which is adapted to receive the container which holds the supply of test tubes, the container which holds a supply of corks, a casing containing pipettes and other apparatus and also the lamp 17 or other form of heating element which may be employed for producing a warm air bath and water bath preparatory to making tests.

In the preferred form of this rack, the same consists of a table having upper and lower plates or sections 28, 29 which are connected at their corresponding corners by legs 30 projecting downwardly therefrom, said table sections or plates being provided with a plurality of registering openings 31 which are adapted to receive the test tubes and are preferably arranged in regular rows lengthwise and crosswise of the rack so as to facilitate keeping the test tubes in order and maintaining a record of the same during the operation of making tests of different samples of milk or other liquids which are to be tested. When the apparatus is in use for making tests, the table or supporting plates of the rack is arranged in the upper part of the water tank below the water level therein and is supported in this position by means of its legs resting at their lower ends on the bottom of the water tank, as shown in Figure 3. When, however, this apparatus is rearranged so as to permit of folding or packing the same compactly, the rack is inverted so that its table or perforated plates rest on the bottom of the water tank and its legs project upwardly therefrom in the corner of the tank thereby providing a storage space within the upper part of the latter as above described, and as shown in Figures 4 and 6.

In the preferred organization of this testing apparatus, the supply of test tubes is preferably stored in a container which is of rectangular form and has its walls 32 constructed of sheet metal and provided at its upper end with a removable cover 33, while its bottom 34 is constructed of perforated metal, thereby permitting this container to be used as a drying box after the tubes have been used by placing the tubes into this box with their mouths turned downwardly toward the bottom, but at other times when the tubes are dry, the same may be stored within this container with their mouths facing upwardly toward the cover and thus reduce the possibility of dust getting into the tubes.

The corks 27 are stored in a container which is preferably of rectangular form and has its walls 35 constructed of sheet metal and provided with a detachable cover 36 and a perforated bottom 37 so as to permit of conveniently draining or drying these corks after the same have been washed and placed in the cork container while still moist or wet.

Figure 5:
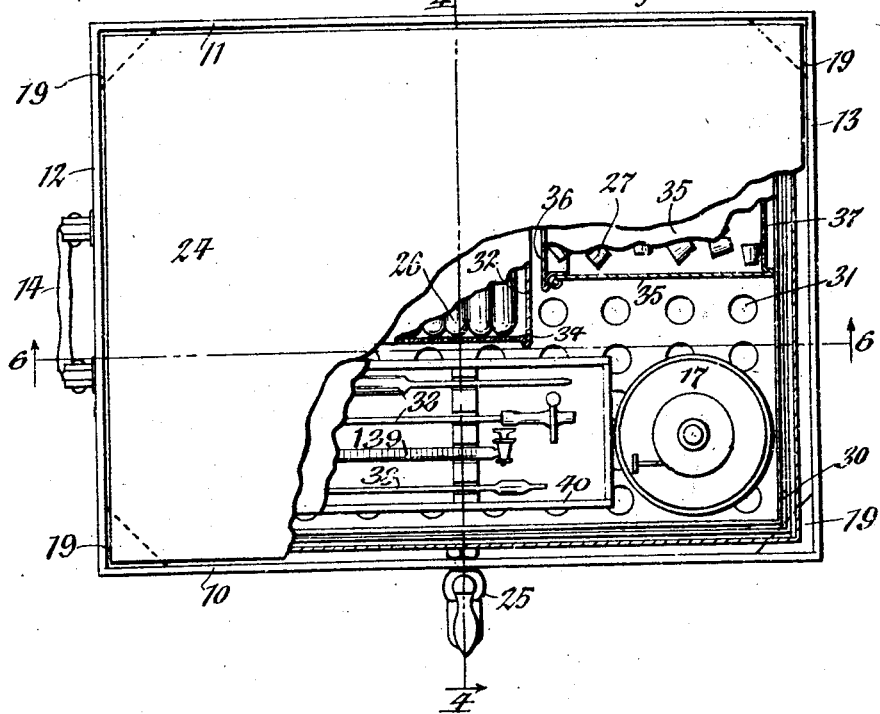
Figure 5 is a top plan view of the parts shown in Figure 4 with the cover of the water tank removed and parts of the covers of the test tube box, cork box, and pipette box partly broken away.
Figure 6:
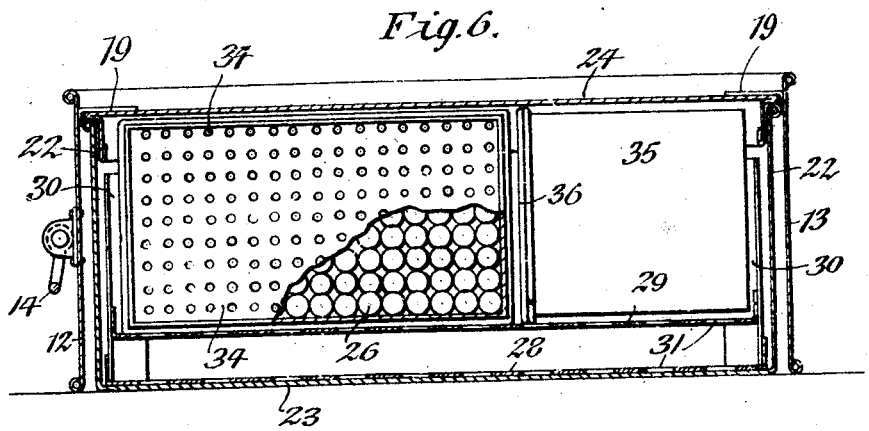
Figure 6 is a longitudinal section of the apparatus in its completely folded or condensed condition corresponding to Figure 2.

The pipettes 38 forming parts of the means for taking samples of the solutions which are to be tested and the thermometer 39 for observing the temperature of the water bath in the tank and other accessories of a like character such as a burette 139 may be enclosed in a casing 40 of any suitable character, which casing together with the heating lamp 17, test tube draining box and cork or stopper draining box are placed side by side in a space within the water tank above the inverted test tube rack, as shown in Figures 4, 5 and 6, thereby utilizing this space to the best advantage and reducing the bulk of the apparatus as a whole. This water tank containing the above mentioned parts after being lifted off from the base or air chamber is introduced into the latter from the bottom thereof, whereby the air chamber and water tank are telescoped one within the other and the walls of the air chamber form an enclosing casing for the apparatus. These several parts may now be securely fastened together so that they will not come apart while carrying or transporting the same for which purpose it is preferable to employ a strap 41 which is passed around the walls of the air chamber and around the bottom and cover of the water tank and through the handle 14 of the air chamber then secured together at its ends by means of a buckle 42, as shown in Figure 2, thereby producing a very compact and neat appearing parcel which can be readily transported from place to place with facility and with perfect safety to the several parts constituting the testing apparatus.

This apparatus as a whole is very simple and comparatively inexpensive in construction, it contains no parts which are liable to get out of order, it permits of assembling the parts when not in use so as to produce a very compact structure while at the same time permitting the several parts to be readily set up and assembled in their proper relative position ready for use and making a plurality of tests with facility and expedition and thus enable this work to be done at a minimum cost.

I claim as my invention:

1. A chemical bacteriological testing apparatus comprising an air chamber having an open top and bottom, an inlet in the lower part of one of its walls for the admission of air and the introduction of a heating burner, air outlet openings in the upper parts of its walls, and internal shoulders on the upper parts of its walls, and a water tank of smaller dimensions than said air chamber adapted to rest with its bottom on said shoulders and provided with a drain cock on one of its walls in line with the inlet opening of said air chamber.

2. A chemical bacteriological testing apparatus comprising an air chamber having an open top and bottom, an inlet in the lower part of one of its walls for the admission of air and the introduction of a heating burner, air outlet openings in the upper parts of its walls, and internal shoulders on the upper parts of its walls, a water tank of smaller dimensions than said air chamber adapted to rest with its bottom on said shoulders and provided with a drain cock on one of its walls in line with the inlet opening of said air chamber and a cover for said tank.

3. A chemical bacteriological testing apparatus comprising an air chamber having an open top and bottom, an inlet in the lower part of one of its walls for the admission of air and the introduction of a heating burner, air outlet openings in the upper parts of its walls, and internal shoulders on the upper parts of its walls, a water tank of smaller dimensions than said air chamber adapted to rest with its bottom on said shoulders and provided with a drain cock on one of its walls in line with the inlet opening of said air chamber, a reversible rack arranged in said tank and adapted to support test tubes, and a cover for said tank.

HARRY F. LICHTENBERG.